United States Patent [19]

Ess

[11] 4,381,686

[45] May 3, 1983

[54] APPARATUS FOR CUTTING AND CONVEYING PLANAR WORKPIECES

[75] Inventor: Wilfried Ess, Schwarzach, Austria

[73] Assignee: Schelling & Co., Schwarzach, Austria

[21] Appl. No.: 265,423

[22] Filed: May 19, 1981

[30] Foreign Application Priority Data

May 21, 1980 [AT] Austria ................................ 2724/80

[51] Int. Cl.³ .......................... B23D 47/04; B27B 5/06

[52] U.S. Cl. ........................................ 83/104; 83/157; 83/256; 83/404.2

[58] Field of Search ............... 83/104, 157, 256, 404.2

[56] References Cited

U.S. PATENT DOCUMENTS 3,768,352 10/1973 Campbell ............................ 83/104

4,156,376 5/1979 Benuzzi ................................ 83/157

4,206,670 6/1980 Benuzzi ............................. 83/404.2

*Primary Examiner*—James M. Meister

*Attorney, Agent, or Firm*—Toren, McGeady and Stanger

[57] ABSTRACT

A sawing machine having a first and a second saw with cutting planes generally perpendicular to each other includes a mechanism for conveying cut planar workpieces from one saw to the other. The mechanism includes a plurality of rows of rollers located adjacent each other and spaced apart with a grate mechanism having grate elements extending between the rows of rollers being movable to transport cut workpieces from a support table of the first saw to the roller rows. A gap formed between the work table of the first saw and the roller rows enables trim waste to fall from the support table, and the grate mechanism is pivotally mounted for reciprocal movement between the support table and the roller rows during which it bridges the gap therebetween.

9 Claims, 6 Drawing Figures

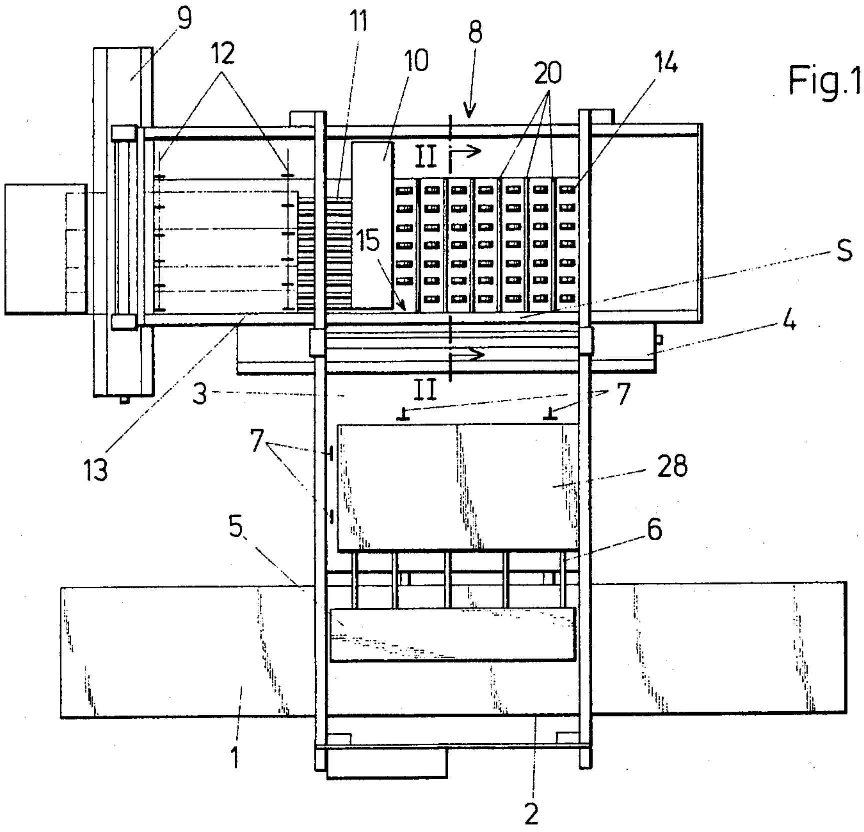
Fig.1
Fig. 2
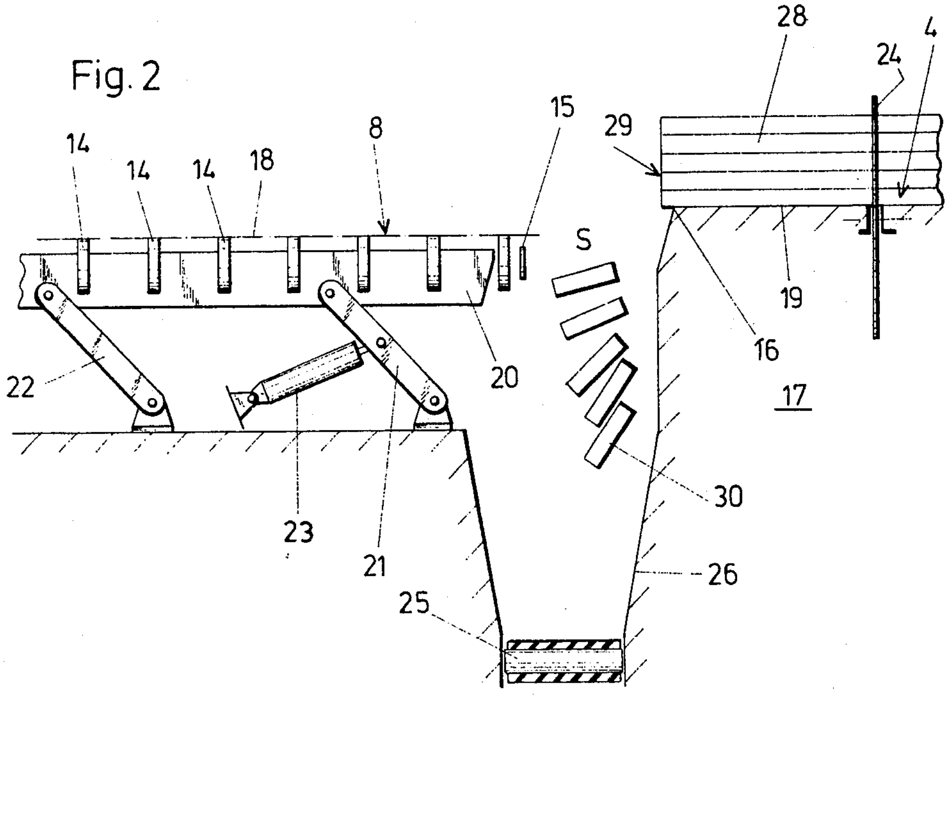

APPARATUS FOR CUTTING AND CONVEYING PLANAR WORKPIECES

The present invention relates generally to cutting apparatus and more particularly to a saw assembly and to conveying mechanisms therefor. More specifically, the invention relates to an apparatus including a pair of saws having cutting planes which are arranged generally perpendicularly with each other with feeding devices being assigned to each saw and with a support table wherein there are arranged alignment means for positioning of planar workpieces to be cut by the apparatus in relation to the cutting plane of the saws.

During cutting of the planar workpieces, there will generally be produced trim waste material. By contemporary standards for operation of devices of the type to which the present invention relates, these trim wastes or shavings must be removed in a generally automatic manner. In certain installations, this occurs by either dumping the wastes into a container or by use of a conveyor belt.

In more elaborate and expensive sawing apparatus exhibiting high performance characteristics, there is provided, after the longitudinal-cut saw thereof, a buffer zone having a length corresponding to the width of the planar workpieces which are to be cut and an angle transfer device is located adjacent this buffer zone. Longitudinal cuttings are deposited between the sawing device and the buffer zone. A depositing or dumping slot is provided for this purpose. Such a depositing slot is opened and closed either by a lid or by displacement of the buffer zone which is constructed as a table.

In less elaborate and thus less expensive cutting devices exhibiting lower performance characteristics, the angle transfer device is arranged directly behind the first or longitudinal-cut saw so that the divided strips may be conveyed directly without further manipulation by means of a conveyor truck or feeding device into the cross-cut saw. In order to ensure a trouble-free operating cycle, these shavings must, however, be removed before the workpiece strips arrive at the cross-cut saw.

In known devices, the table is constructed as a smooth surface. It is located immediately adjacent the longitudinal-cut saw. The shavings remain on the table and are pushed further along by a subsequent strip or workpiece until they fall off the outer edge of the table.

Drawbacks arise in such a device because displacement of these longitudinal shavings into the cross-cut saw cannot be avoided with certainty whereby aligning of the workpiece strips may be impaired. A further drawback arises in that there cannot be provided in the support table a groove or similar element in which the lower jaws of the clamps of the feeding device may move.

In another known mechanism of this type there is also provided a smooth table surface. However, there is provided a slot cut out between the longitudinal-cut saw and the table. If this slot is provided with a fixed width, then bent shavings are prevented from falling away and from being dumped with certainty. If the slot is equipped with a lid or similar closing device, then the slot may be made much larger so that even bent shavings may be disposed of with certainty. However, a drawback of this device resides in the fact that with narrow workpiece strips, there is the danger that they may become stuck at the rims of the grooves at their edges.

In mechanisms of the type described known thus far, upon completion of a trim cut the workpieces are directly and immediately pushed into the cross-cut saw at a right angle. This requires that in the cutting edge of the first longitudinal-cut saw there is no obstacle in the form of a structural element. For this reason, guides for the clamping bar or press beam, which is usually provided in such sawing devices, must be attached on one side of the machine table. This requires elaborate structural elements having large dimensions.

In a machine for staggered cutting of workpieces known from German Offenlegungsschrift No. 27 41 955, the incident trim wastes are removed if possible immediately from the path of the workpieces so that they will not impede subsequent passage and positioning thereof. For this purpose, support plates forming the machine table and limiting the cutting slot of the circular saw are mounted in a manner to be tiltable against the saw around a horizontal axis parallel to the cutting slot, which axis is in the immediate vicinity of the cutting plane of the saw blade. Thus, a trimmed strip which might possibly lie on the support plates falls toward the middle of the machine table upon tilting.

The drawbacks of constructions of this type are fairly apparent. The tiltable mounting of the support plates situated sidewise of the cutting plane of the circular saw will doubtless affect in a negative manner the stability of the machine table and thus the precision of the cuts which are made. Such devices utilize a below-the-table circular saw wherein the saw blade travels along the machine table during the cutting process and upon completion thereof is lowered below the plane of the table and then is moved back to its initial position. During the return of the saw blade below the machine table, trim wastes cannot be dumped into the area traversed by the sawing unit until the saw has returned to its initial position and is at rest. This causes lost time and thus diminishes performance characteristics. Since in the central machine area below the table plane there are provided structural elements which guide, drive and otherwise control the sawing unit, it is not expedient to deposit trim shavings into this area. Along with solid waste pieces, sawdust may also penetrate into this area of the machine. Since in order to effect exact guiding of the cutting unit, there will arise relatively high expenses in terms of the construction involved, it is not desirable to deposit shavings into an area which, among other things, relates to the precision with which the sawing machine is operated.

Additionally, in a known proposal of the type discussed, the volume of waste products which may be handled is limited. Large waste shavings cannot be deposited into the central area. Because of increasing use of computerized cutting pattern optimization, there are produced during the trim cuts waste products of substantial proportions. These wastes can no longer be accommodated by restricted and constructionally encumbered central areas of the machine.

The invention is directed toward a machine construction for staggered cutting of workpieces wherein no buffer zone is provided, the construction being arranged in such a way that strips cut off by the first or longitudinal-cut saw may immediately be conveyed to the cross-cut saw without drawbacks of the type described above. The invention is thus directed toward improving the structure of devices of the type described which will achieve ease of performance and greater facility in dealing with waste parts.

SUMMARY OF THE INVENTION

Briefly, the present invention may be described as apparatus for cutting and conveying planar workpieces comprising a first and a second cutting saw arranged with cutting planes generally perpendicular to each other, first feeding means for feeding planar workpieces to be cut to the first saw, said first feeding means including means defining a generally horizontal support plane upon which said workpieces are supported during cutting by said first saw, and second feeding means for feeding cut workpieces from the first saw to the second saw. The second feeding means comprise roller means including a plurality of rows of rollers located adjacent each other and spaced apart for conveying cut workpieces from the first saw to the second saw, said roller means being situated to define a roller support plane for the workpieces which is positioned lower than the horizontal support plane of the first feeding means. The horizontal support plane and the roller support plane are horizontally spaced apart to define therebetween a gap into which trim waste may be deposited. Grate means including a plurality of grate elements are located between the rows of rollers and the grate means are mounted for movement between the roller means and the first feeding means to transfer workpieces therebetween, with the grate means being movable at least to the height of the horizontal support plane of the first feeding means so as to bridge the gap therebetween when in this position.

Thus, in the operation of the invention, the grate means are moved away from the horizontal support plane, which may be defined by a machine table of the first saw, and thus a gap is opened between the roller means and the machine table of the first saw. After a cut is made, wastes are permitted to drop into this gap and the grate means may then be moved laterally and upwardly to bridge the gap and to lie at a level generally at the same elevation with the plane of the machine table of the first saw. Cut workpieces may then be transferred onto the grate means which may then be moved laterally and lowered so that the workpieces may be deposited on the roller means whereby they may be conveyed to the second saw.

As a result of the construction of the invention, it is possible to construct the second feeding means to comprise a transfer table which is composed of rolls or rollers interposed between the two saws. As a result, the surfaces of the stacked workpieces will be protected from damage. Between the rollers and also between the rolls thereof there will be provided free spaces through which lower jaws of clamps for the feeding units can move, these clamps being necessary for the performance of precise cutting. There can, moreover, be utilized standardized sawing machines which have clamping bars or press beams extending on both sides. Beyond that, the construction in accordance with the invention offers the advantage that during the cutting process, individual strips of workpieces or even entire workpiece strips may be immediately removed once they have been withdrawn from the cutting plane of the saw. This is essential for the ensuing transverse feeding devices in the operating sequences. Since at the end of the horizontal path traveled by the sawing unit of the saw there are attached supports for clamping bars or press beams, the workpiece strips that are guided away cannot be displaced along the cutting plane of the saw through the feeding device. Either the support element provided for the attachment of the clamping bar would have to be arranged and constructed in such a way that it does not protrude sideways over the saw-cut plane, which does not provide a technically satisfactory solution, or otherwise the strips must be removed from this cutting plane. Therefore, a construction in accordance with the present invention provides significant advantages.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DESCRIPTION OF THE DRAWINGS

In the drawings:

FIG. 1 is a plan view of a sawing apparatus in accordance with the present invention;

FIGS. 2, 3, and 4 are side views partially in section showing the principal elements of the invention during different stages of the operating cycle thereof, these figures being taken along the line II—II of FIG. 1;

DETAILED DESCRIPTION OF THE PREFERRED EMBODIMENTS

Figure 3:
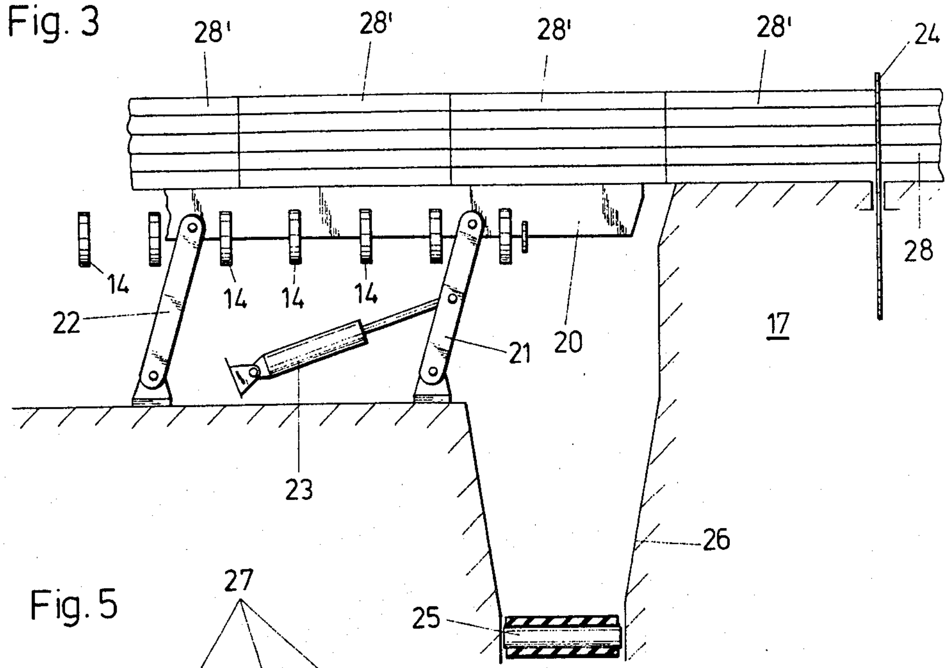

Referring now to the drawings, there is shown particularly in FIG. 1, an overall plan view of a sawing apparatus embodying the present invention. In the apparatus depicted in FIG. 1 there is provided an input roll conveyor 1, a lifting table 2, a first support table 3 operable in connection with the first or longitudinal-cut saw 4, a feeder 5 coordinated with the longitudinal-cut saw, clamps 6, and an alignment member 7.

From the viewpoint of the operating direction of the apparatus there is arranged behind the longitudinal-cut saw 4 a support table 8 for a second or cross-cut saw 9. The cross-cut saw 9 is also provided with a feeder or supply device 10 having several clamps 11. Mounted forwardly of the cross-cut saw 9 there are also provided several workpiece alignment members 12 which are functionally interrelated with a longitudinal stop 13.

The description which follows is particularly directed to the construction of the support table 8 which is interposed between the two saws 4 and 9. The support table 8 basically consists of a plurality of freely rotatable rollers 14 which are arranged in spaced rows, with the rotational axes of the rollers 14 being parallel to the cutting edge of the cross-cut saw 9. Thus, it will be seen that the axes of rotation of the rollers 14 will extend parallel to the cutting plane 24 of the longitudinal-cut saw 4, which cutting plane is also generally perpendicular to the cutting plane of the cross-cut saw 9.

The individual rows of rollers 14 are spaced away from each other with the rows of rollers being arranged so as to be stationary. A side 15 facing the longitudinal-cut saw 4 of the support table 8 operates to define the limits with an outer edge 16 of a machine table 17 of a relatively wide gap S.

The support plane 18 defined by the rollers 14 is arranged to lie somewhat below a support plane 19 of the machine table 17 of the longitudinal-cut saw 4.

Between and parallel to the rows of rollers spaced from each other there are provided a plurality of gibs or grate members 20 which are joined together to form a support grating. The gibs 20 are joined together and supported by pivotel levers 21 and 22, with the levers 21, 22 being pivotally mounted to enable the support grating to be lifted and to be displaced sidewardly by operation of a piston-cylinder unit 23.

In the operation of the device, the support grating formed of the gibs 20 will assume two operative end positions. In one of these positions, the support grating will lie below a surface 18 defined by the rollers 14. With the support grating in this position, there will be defined a gap S which is limited on one side by a side 15 of the support roller assembly and on the other side by an outer edge 16 of the machine table 17 upon which planar workpieces 18 are supported during cutting by the saw 4.

When the support grating is moved to its other end position, the gibs 20 which form the support grating are lifted by pivotal motion of the levers 21, 22 and the upper edges of gibs 20 will be arranged to lie on a plane which is generally parallel and vertically aligned with a plane 19 of the machine table 17. This operating position of the support grating formed by the gibs 20 is shown in FIG. 3. With the support grating in this position, the gap S will now be closed, as seen in FIG. 3.

Running below the gap S for the purposes of receiving trim shavings, there is provided a conveyor belt 25 which forms the floor of the receiving shaft 26 which is essentially a vertical extension of the gap S. The conveyor belt 25 is open to the side.

Figure 5:
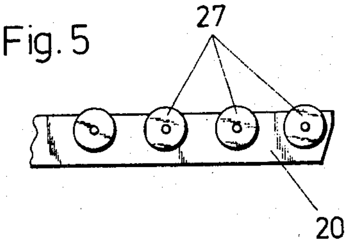
FIG. 5 is a simplified side view of roller elements which may be utilized with the invention.

The surfaces of the gibs 20 may be covered with a surface protecting, friction reducing coating which, for example, may be a carpet-like coating but there may also be provided here rolls 27 placed one behind the other as illustrated schematically in FIG. 5. These rolls may extend somewhat above the upper edge of the gibs 20 in such a manner that workpieces resting on the gibs 20 will rest upon the rollers themselves and may thus be moved without a significant amount of force.

The principal elements of the invention relate to the area where planar workpieces are transferred between the first saw 4 and the second saw 9 and particularly to the support table 8 which is provided for this purpose. Feeding of workpieces by means of feed roll conveyors, the alignment of workpieces and their cutting in the cross-cut saw and the alignment procedures involved therewith need not be discussed in detail in order to understand fully the operation of the invention. These operating processes are known in such devices and therefore they will be within the knowledge of one having ordinary skill in the art.

During the operation of the apparatus of the invention, when a new stack of planar workpieces 28 is provided to the longitudinal-cut saw 4, the support grating formed by the gibs 20 will at first be in its lowered position depicted in FIG. 2. The longitudinal-cut saw will first make a trim cut along its cutting plane 24 and the stack of planar workpieces 28 will now be pushed forwardly by means of the feeder 5 to a distance so that the cut plane 29 of the trim cut will lie generally in alignment with the edge 16 of the machine table 17.

The operational sequences whereby these movements are performed may be pre-programmed based upon a cutting pattern to be produced and they are performed automatically by the machine.

Trim wastes 30 will now be able to fall freely through the open gap S into the shaft 26 onto the conveyor belt 25. The stack of planar workpieces 28 will now be driven by means of the feed device 5 into its first cutting position. The support grating composed of the gibs 20 is now lifted and propped against the machine table 17 as shown in FIG. 3. With the support grating in this position, the gap S will be closed. The longitudinal-cut saw 4 will now effect another cut through the stack of workpieces 28 in a programmed manner and an individual stack of strips 28′ that have been cut will now be urged forwardly on to the support grating by means of the feeder 5.

The cutting of the stack 28 may now occur in such a manner that the entire stack will be divided into strips of equal size or otherwise there may be cut off each time strips of varying widths. Of course, a third possibility is that strips of the same width can be cut in groups from a particular stack of workpieces. In such a case reference may be made to strip areas.

The strips that have been cut are now supported in groups or in their entirety in the manner described upon the support grating formed by the gibs 20 and this grating will then be again lowered by activation of the piston-cylinder unit 23 in order to pivot the pivotable levers 21, 22 so that the strips may be moved to now rest upon the rollers 14.

The feeder 10 may then be activated and the clamps 11 will grip the strips at the backward face side and push the strips forwardly toward the cross-cut saw 9.

The last cut which is made on the stack of workpieces 28 by the longitudinal-cut saw 4 is also the rearmost trim cut. With the grating gibs 20 at first still raised, as seen in FIG. 3, the clamps 6 of the feeder 5 travel up to a point beyond the cutting plane 24 of the saw 4 into the area of the edge 16 of the machine table 17 in such a manner that the rearward trim shaving products 30′ will lie between the clamps 6 and the last strip stack 28′ that has been cut. The grating gibs 20 are now lowered as seen in FIG. 4 by operation once again of the piston-cylinder unit 23. The gap S will thereby be opened and the rearmost trim wastes 30′ may then freely fall into the gap and onto the conveyor belt 25.

Figure 4:
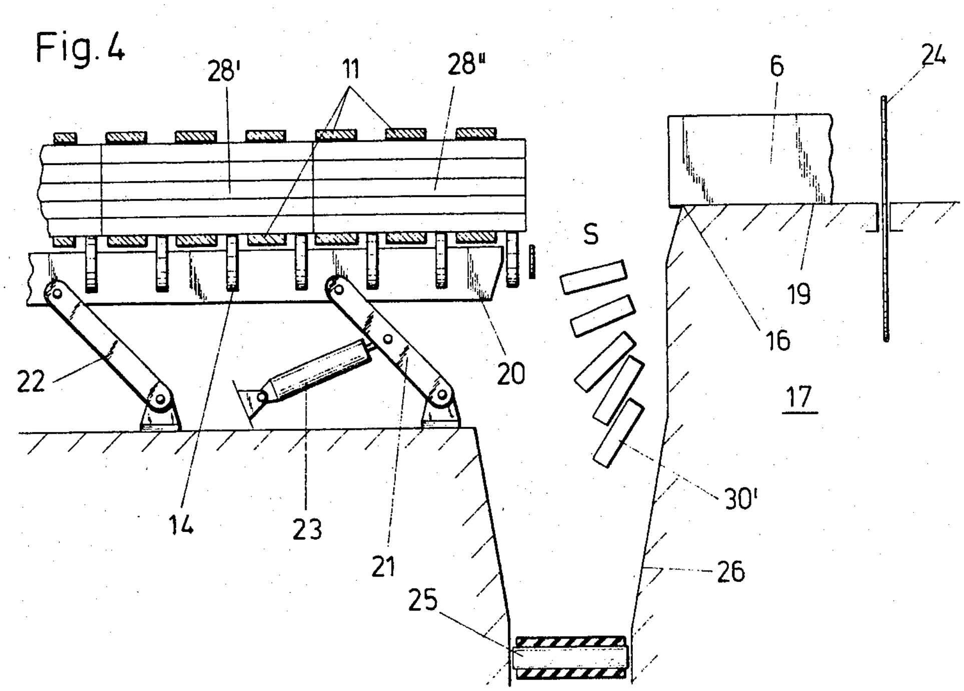

It will also be seen from FIG. 4 that the clamps 11 of the feeder 10 have already gripped the workpieces or strips 28′ and 28″. The lower jaws of the clamps 11 travel without impediment between the rollers 14 of the row of rollers during the feeding operation. If rolls are used instead of rollers, then grooves must be milled therein or punched in such rolls in order to take up the lower jaws of the clamps 11.

In accordance with the device of the present invention, there may be utilized standardized sawing machines having clamping bars or press beams extending on both sides. Moreover, in view of the invention there may be provided behind the cutting plane 24 of the longitudinal-cut saw 4 a large slot opening through which trim shavings can fall without impediment even if they should be very long and, beyond that, warped and it is further possible to equip the feeders for the longitudinal-cut saw as well as for the cross-cut saw with clamping jaws. This is something that is possible only to a very limited extent in similar devices of the prior art and, thus, it will be seen that the present invention overcomes substantial drawbacks previously described.

Figure 6:
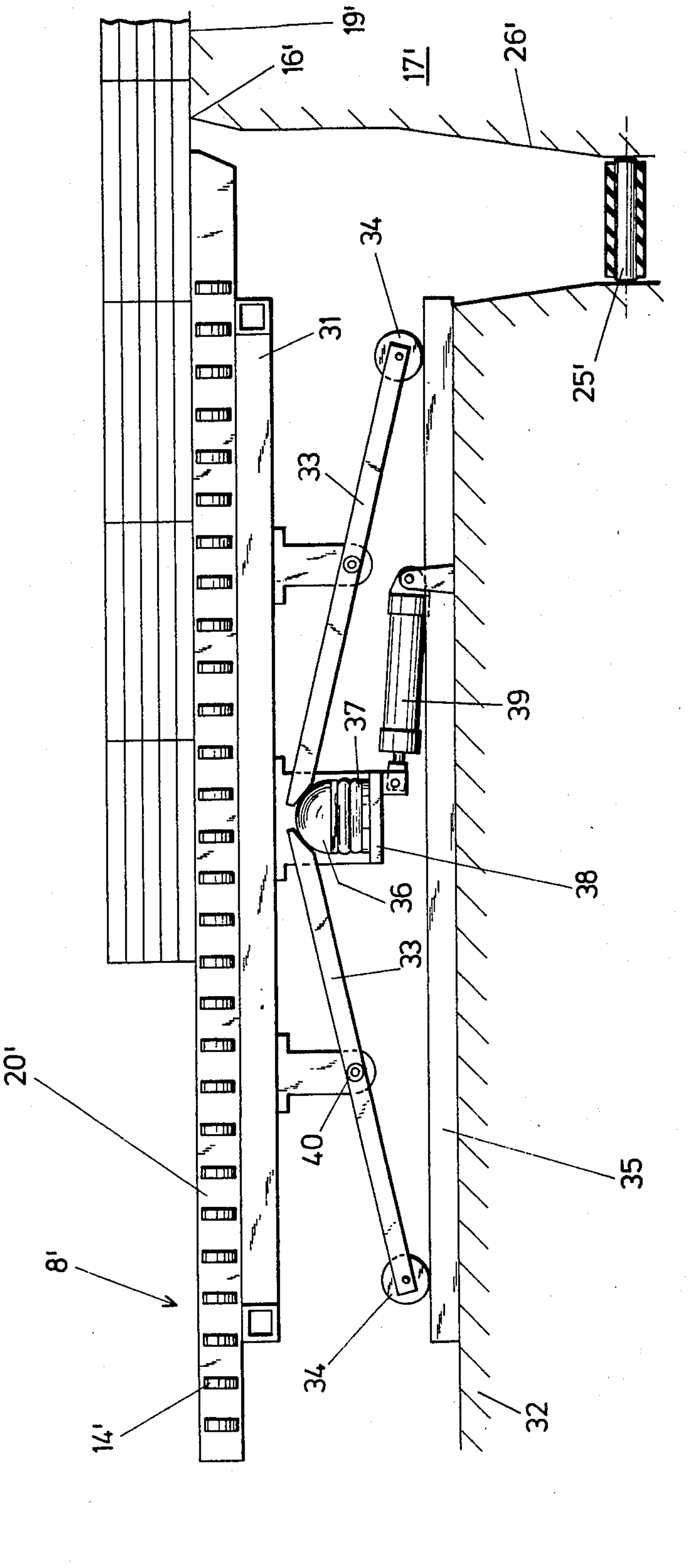
FIG. 6 is a side view partially in section of another embodiment of the invention.

A further embodiment of the invention is shown in FIG. 6 wherein the differences in construction between the embodiment of FIG. 6 and the embodiment of FIGS. 2–4 relates to the lifting device for the support grating formed by gibs 20'. In FIG. 6, similar parts are identified with similar reference numerals. In FIG. 6, the gibs 20' forming the support grating rest upon a support frame 31 which is supported in relation to a machine chassis 32 by means of pivotable double-armed levers 33. A pivot bearing 40 of these double-armed levers arranged in pairs is fastened at the underside of the support frame 31. The double-armed levers have, at their free ends, casters 34 which may roll along guideways 35.

With their inner ends which face each other, the levers 33 prop themselves against a roll-shaped or spherical abutment 36 supported upon a bellows cylinder 37. The bellows cylinder 37 in turn fits on a support girder 38 arranged on the underside of the support frame 31.

Upon the support girder 38 for the bellows cylinder 37 there acts a substantially horizontally directed piston-cylinder unit 39 mounted on the machine chassis 32 at its other end. This piston-cylinder unit effects the sideward displacement of the support frame 31 and thus of the gibs 20'. By activation of the bellows cylinder 37, the levers 33 are pivoted and thereby the support frame 31 whereby the gibs 20' are raised or lowered in a manner similar to that previously described in connection with the embodiment of FIGS. 2–4. The lifting device according to the embodiment of FIG. 6 effects, as a result of its symmetrical construction, an exactly parallel displacement of the support grating formed by the gibs 20'.

While specific embodiments of the invention have been shown and described in detail to illustrate the application of the inventive principles, it will be understood that the invention may be embodied otherwise without departing from such principles.

What is claimed is:

1. Apparatus for cutting and conveying planar workpieces comprising: a first and a second cutting saw arranged with cutting planes generally perpendicular to each other; first feeding means for feeding planar workpieces to be cut to said first saw, said first feeding means including means defining a generally horizontal support plane upon which said workpieces are supported during cutting by said first saw; and second feeding means for feeding cut workpieces from said first saw to said second saw, said second feeding means comprising roller means including a plurality of rows of rollers located adjacent each other and spaced apart for conveying said workpieces from said first saw to said second saw, said roller means being situated to define a roller support plane for said workpieces which is positioned lower than said horizontal support plane of said first feeding means, said horizontal support plane and said roller support plane being horizontally spaced apart to define a gap therebetween, grate means including a plurality of grate elements located between said rows of rollers and grate support means mounting said grate means for movement between said roller means and said first feeding means at least to the height of said horizontal support plane of said first feeding means and to bridge said gap.

2. Apparatus according to claim 1 wherein said grate elements are formed with a surface-protecting, friction-reducing covering.

3. Apparatus according to claim 1 wherein said grate elements are formed with roller devices situated one behind the other, said roller devices having turning axles arranged so as to be parallel to a cutting plane of said first saw, said roller devices together forming said roller support plane for said workpieces.

4. Apparatus according to claim 1 wherein said grate support means comprise means for moving said grate elements parallel to each other and to effect vertical displacement and lateral displacement thereof.

5. Apparatus according to claim 1 wherein said grate support means comprise double-armed pivotable levers.

6. Apparatus according to claim 5 wherein said double-armed levers are arranged pivotably and in pairs on the underside of said grate means with said grate support means further comprising support rollers running on guides with said double-armed levers including ends directed toward one another abutting on a lifting device formed as a pneumatically activated bellows member.

7. Apparatus according to claim 5 further including a pneumatic piston-cylinder unit operable to actuate said double-armed pivotable levers.

8. Apparatus according to claim 1 further comprising a conveyor belt located to receive workpiece parts falling through said gap.

9. Apparatus for cutting and conveying planar workpieces comprising: a first and a second cutting saw arranged with cutting planes generally perpendicular to each other; first feeding means for feeding planar workpieces to be cut to said first saw, said first feeding means including means defining a generally horizontal support plane upon which said workpieces are supported during cutting by said first saw; and second feeding means for feeding cut workpieces from said first saw to said second saw, said second feeding means comprising roller means including a plurality of rows of rollers located adjacent each other and spaced apart for conveying cut workpieces from said first saw to said second saw, said roller means being situated to define a roller support plane for said workpieces which is spaced apart horizontally from said horizontal support plane of said first feeding means to define a gap therebetween; grate means including a plurality of grate elements located between said rows of rollers; and grate support means mounting said grate means for movement between said roller means and said first feeding means; said grate means being movable from a first position generally adjacent said first feeding means to a second position generally congruent with said roller means; said grate means when in said first position being arranged to bridge said gap and to receive from said first feeding means workpieces to be transferred to said roller means and when in said second position opening said gap to allow trim waste from said workpieces to fall freely through said gap, said grate means in said second position being operable to deposit workpieces received from said first feeding means onto said roller means.

* * * * *